Figures 1, 2:
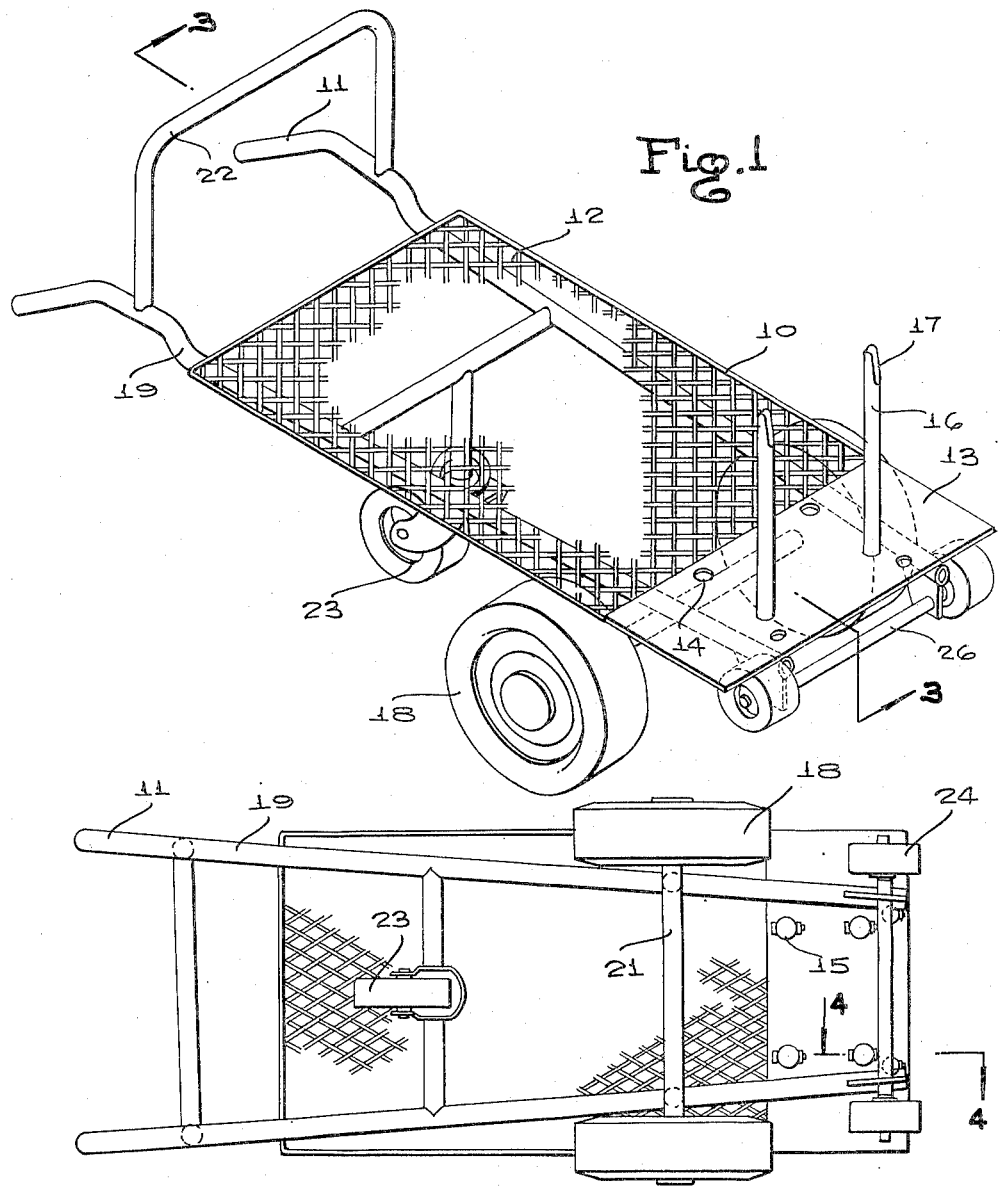

Jan. 7, 1958   R. W. DUNKIN   2,818,988
MASONRY BLOCK CART
Filed Dec. 17, 1954   2 Sheets-Sheet 1

INVENTOR
RICHARD W. DUNKIN

BY
McMorrow, Berman + Davidson
ATTORNEYS

Jan. 7, 1958 R. W. DUNKIN 2,818,988
MASONRY BLOCK CART
Filed Dec. 17, 1954 2 Sheets-Sheet 2
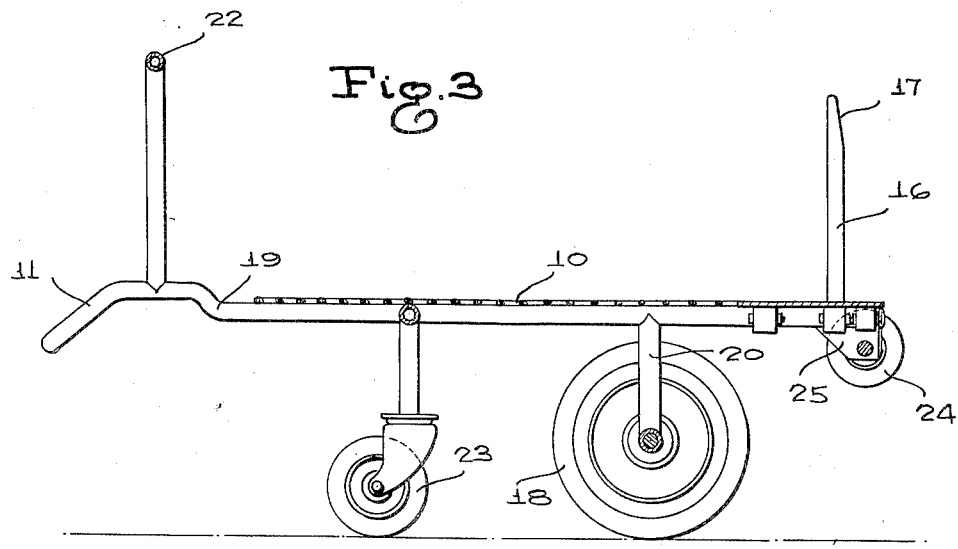
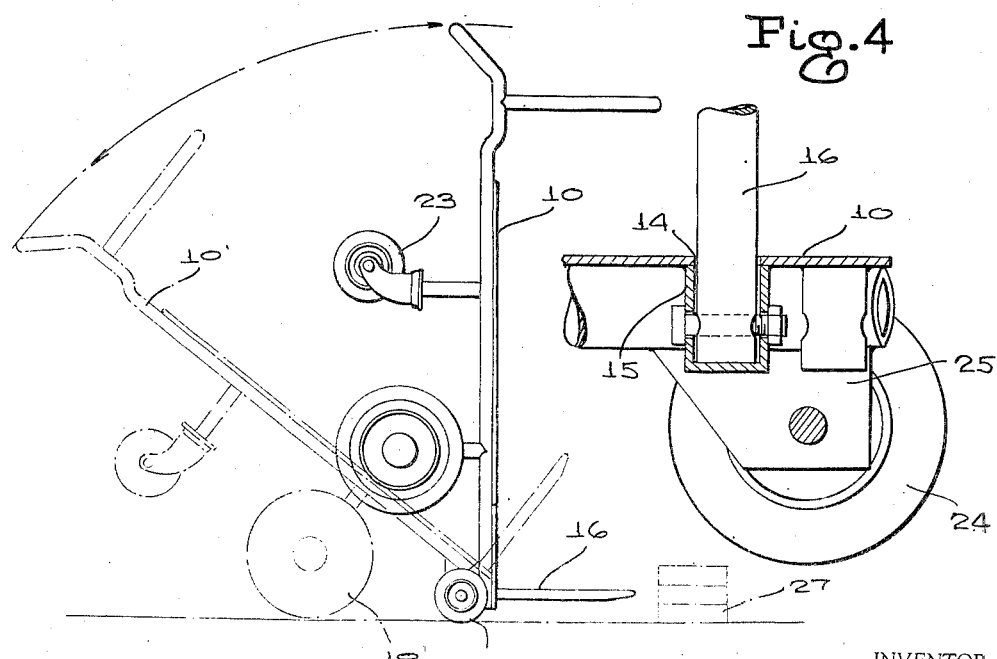
INVENTOR
RICHARD W. DUNKIN
BY
McMorrow, Berman & Davidson
ATTORNEYS United States Patent Office 2,818,988
Patented Jan. 7, 1958

2,818,988

MASONRY BLOCK CART

Richard W. Dunkin, Anderson, Ind.

Application December 17, 1954, Serial No. 475,898

2 Claims. (Cl. 214—384)

The present invention relates to hand trucks or carts for transporting stacks of masonry blocks of the type having cells.

The primary object of the present invention is to provide a new and improved hand truck or cart, one having special means for engaging the openings in the lowermost one of a stack of celled blocks and for lifting the stack of blocks to a position for transporting the blocks.

Another object of the present invention is to provide a hand truck or cart for handling stacks of masonry blocks which provides means for transporting the blocks in either of two conditions of transport.

A further object of the present invention is to provide a hand truck for masonry blocks of sturdy construction, economical to manufacture, and one which transports the stack of masonry blocks in either one of two conditions of transport, in one condition of which the blocks are supported almost totally upon the supporting wheels of the truck with little or no load placed upon the handles of the truck.

A still further object of the present invention is to provide a new and improved hand truck for handling celled masonry blocks, and which has interchangeable support means by means of which blocks of various sizes and shapes may be readily handled.

These and other objects and advantages of the present invention will be fully apparent from the following description when taken in connection with the annexed drawings, in which:

Figure 1 is an isometric view of the present invention,
Figure 2 is a bottom view of the present invention,
Figure 3 is a side view in elevation of the present invention on line 3—3 of Figure 1,
Figure 4 is a detailed view on line 4—4 of Figure 2, and
Figure 5 is a side view showing the positions to which the invention may be turned for purposes to be explained later.

Referring in greater detail to the drawings in which like numerals indicate like parts throughout the several views the invention consists of a hand truck having a platform 10 with a pair of handles 11 connected at one end of the platform and with an intermediate section 12 composed of an open mesh wire frame.

Adjacent the other end of the platform is positioned a horizontally disposed steel plate 13 having at least two longitudinally extending rows of spaced apertures 14 with a socket 15 on the under face of said plate and in registry with each aperture, the sockets being shown most clearly in detail in Figure 4.

A plurality of tines 16 are provided, each of them adapted to have one end inserted within selected ones of the socket 15 to project perpendicularly from the upper face of the platform 10. The upper ends of each of the tines 16 are tapered on one side to provide a flat portion 17 permitting the tines 16 to be slipped under a pallet or skid of relatively low height.

A pair of main wheels disposed underneath the platform 10 one adjacent each side of the platform and intermediate the end of the platform. The handles 11 are formed from the free ends of a pair of tubular steel pieces 19 which extend to the other ends of the platform and have welded to them the support bars 20 connected one to each end of the axle 21 upon which the wheels 18 are rotatively mounted.

A U-shaped member 22 forms a second handle and when the platform 10 is in a horizontal position the U-shaped member 22 extends vertically to within easy reach of a person for pushing the truck of the present invention in the horizontal position with the weight of the truck borne by the main wheels 18 and a single castering wheel 23 which is disposed centrally of the platform 10 and between the main wheels 18 and the handles 11 or 22.

At the other end of the platform remote from the handles 11 or 22 is disposed another pair of wheels, auxiliary wheels 24 one on each side of the platform and adjacent the end of the platform. The auxiliary wheels 24 are attached to the pieces 19 by means of relatively short brackets 25 which extend downwardly from the plate 13 and are carried by the shaft 26 extending between the brackets 25.

Referring now to Figures 3 and 5, it will be seen that the truck of the present invention is useful in transporting articles, such as masonry blocks, in the horizontal position shown in Figure 3, at which all the weight of the load on the truck will be borne by the main wheels 18 and the castering wheel 23, and as shown in Figure 5, the main wheel 18 may be used as a fulcrum to tilt the platform upwardly to a tilted position shown in dotted line indicated by the reference numeral 10' at which position the load will be borne on the platform with the weight of the load carried by the main wheels indicated in this view in 18' and the auxiliary wheels 24.

The latter wheels 24 may be used as a further fulcrum about which the platform 10 may be tilted to a vertical position, as shown in Figure 5 in solid lines.

This latter position permits the tines to engage under a stack of solid masonry blocks or other articles to be carried upon the platform 10, or into the openings in celled masonry blocks, one of which is indicated in dotted lines in Figure 5 and represented by the reference numeral 27.

The block 27 may be a single block or may be lowermost one of a stack of similar blocks which, when engaged by the tine 16, will support the remaining blocks in the stack and will permit them to be tipped in contact with the surface of the platform 10 so that the truck of the present invention may be swung to either of the previously described conditions of transport or positions for convenient and easy transport of the blocks during their manufacture or during their use in the buliding construction industry.

While only a single embodiment of the present invention has been shown and described, other embodiments and modifications may be made and practiced wtihin the scope of the appended claims without departing from the spirit of the invention.

What is claimed is:

1. In a hand truck for celled masonry blocks having a platform supported inwardly of one end by a pair of wheels, the improvement consisting in providing a horizontally disposed plate in the upper face of said platform intermediate said wheels and said one end, said plate having at least two longitudinally extending rows of spaced apertures, a socket on the under face of said plate and in registry with each of said apertures, a plurality of tines projecting perpendicularly with respect to said platform and having one end of each received in selected ones of said sockets for engagement by the other end in the openings in celled masonry blocks, and means on said one end of said platform for rollably supporting said one end thereof.

2. In a hand truck for celled masonry blocks having a platform supported inwardly of one end by a pair of wheels, the improvement consisting in providing a horizontally disposed plate in the upper face of said platform intermediate said wheels and said one end, said plate having at least two longitudinally extending rows of spaced apertures, a socket on the under face of said plate and in registry with each of said apertures, a plurality of tines projecting perpendicularly with respect to said platform and having one end of each received in selected ones of said sockets for engagement by the other end in the openings in celled masonry blocks, and a second pair of wheels on said one end of said platform for rollably supporting said platform in a vertical position with said tines disposed horizontally for engagement within the openings in the lowermost one of a stack of blocks.

References Cited in the file of this patent

UNITED STATES PATENTS

| | | |
|---|---|---|
| 310,485 | Wing | Jan. 6, 1885 |
| 1,316,239 | Hogander | Sept. 16, 1919 |
| 1,460,266 | Monroe | June 26, 1923 |
| 1,542,327 | Slingsby | June 16, 1925 |
| 1,725,095 | Morrow | Aug. 20, 1929 |
| 1,835,431 | Ryerson | Dec. 8, 1931 |
| 1,921,661 | Conner | Aug. 8, 1933 |
| 2,373,279 | Vogt | Apr. 10, 1945 |

FOREIGN PATENTS

| | | |
|---|---|---|
| 630,551 | Great Britain | Oct. 17, 1949 |